April 4, 1967 G. I. BARKER 3,312,515
TRANSVERSE ADJUSTMENT BEARING FOR VERTICAL
STORAGE FILING CABINET LATH
Filed Dec. 1, 1965
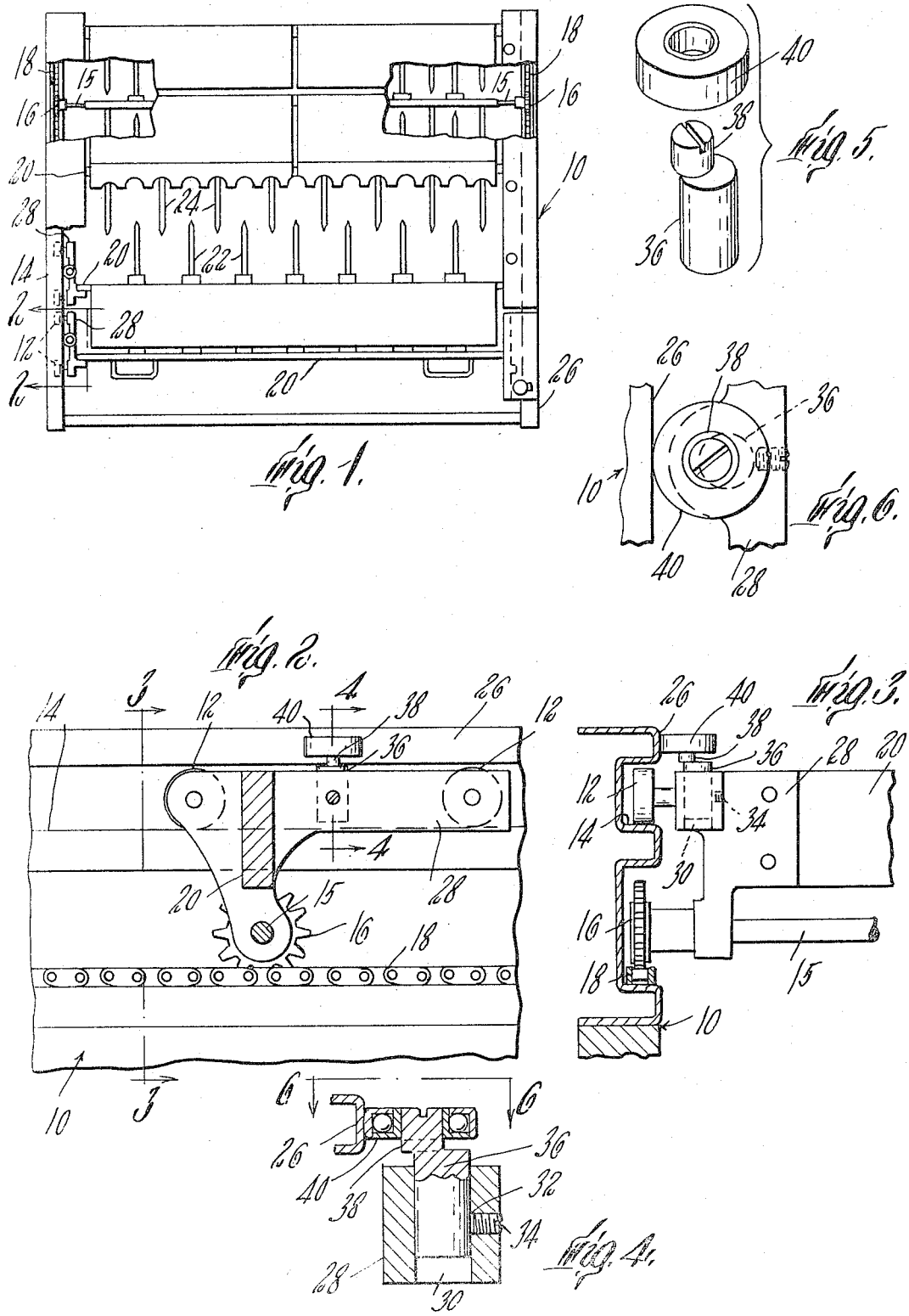

United States Patent Office 3,312,515
Patented Apr. 4, 1967

3,312,515
TRANSVERSE ADJUSTMENT BEARING FOR VERTICAL STORAGE FILING CABINET LATH
Graham Irving Barker, 208 Golden Oaks, Corlett Drive, Johannesburg, Transvaal, Republic of South Africa
Filed Dec. 1, 1965, Ser. No. 511,296
5 Claims. (Cl. 312—321)

This invention relates to transverse adjustment bearings for horizontally arranged movable laths in a filing cabinet for vertical storage of drawings, maps and the like.

It is a primary object of this invention to provide on a lath, having bearings movable in a track, adjustable bearing means for adjusting the transverse position of the lath thereby to insure proper alignment of support pins thereon with perforations in drawings to be suspended from the pins.

Other objects are: to provide means for adjusting the spacing of the bearings in a track from a vertical wall therein to prevent binding; and to provide adjustment means which will not themselves bind.

This invention features in connection with such a lath a horizontally disposed bearing on an eccentrically disposed vertical shaft. The bearing is arranged to bear against a vertical wall of the cabinet. To adjust the wall and lath positioning relative to each other, the eccentric shaft is turned thereby changing the relative positions of the lath and the bearing axis.

Other objects, features and advantages of this invention will appear from the following detailed description of a preferred embodiment thereof, taken together with the accompanying drawings, in which:

FIG. 1 is a plan view, partially cut away, of a vertical storage filing cabinet including the invention;

FIG. 2 is a fragmentary elevation on an enlarged scale taken on line 2—2 of FIG. 1;

FIG. 3 is a sectional view taken along the line 3—3 of FIG. 2;

FIG. 4 is a sectional view taken along the line 4—4 of FIG. 2;

FIG. 5 is an enlarged isometric view of elements of this invention; and

FIG. 6 is a fragmentary plan view taken along the line 6—6 of FIG. 4.

With reference now to the drawings and particularly FIG. 1 thereof, a vertical storage filing cabinet 10 is provided with a plurality of horizontal laths 20 movable on bearings such as rollers 12 in tracks 14 provided in the cabinet. For purposes of this application, it will be understood that the term "lath" includes its support brackets 28 at each end thereof. Shafts 15, connected sprockets 16, and chain members 18 coacting with the sprockets maintain the parallel relationship of the laths to each other as they are moved. Interspersed horizontal pins 22, 24 protruding toward each other from facing portions of the laths 20 are provided to support stored sheet materials, such as maps or engineering drawings.

As seen in FIGS. 2 and 3, at each end of the laths, facing vertical wall members 26 are provided on the cabinet parallel to each other and to the tracks 14 and extending above both the tracks and laths 20.

Adjacent each wall member 26 in each support bracket 28 of each lath 20 is a vertical drilled opening 30 of a predetermined dimension, FIG. 4. A threaded hole 32 in the bracket intersects the opening 30 for a threaded lock screw 34.

A vertical shaft 36 of said predetermined dimension rotatably positioned in each opening 30 extends therefrom above the lath 20. A shaft extension 38 having an axis parallel to but offset from that of the shaft 36 extends upwardly therefrom above the lath 20, see FIG. 5. A bearing 40 is rotatably mounted on the vertical shaft extension 38. In the preferred embodiment, a ball bearing 40 is utilized with its inner race stationary on the extension, but for purposes of this application, "rotatably mounted" includes this preferred arrangement. The bearing 40 is horizontally disposed for rotative abutment against the vertical wall members 26.

In operation, the lath 20 may be adjusted both vertically and transversely of the cabinet by loosening the lock screw 34 and raising or lowering and rotating the vertical shaft 36 to locate the bearing heightwise and to shift the axis of the bearing 40 transversely relative to the lath. When it is in the desired position, locking screw 34 is tightened. Provision of these adjustment means has been found to insure proper spacing of support pins and to prevent binding which might otherwise occur by transverse shifting of the support bearings 12.

Other embodiments of this invention will be apparent to those skilled in the art which are within the spirit and scope of the appended claims.

What is claimed is:

1. In a vertical storage filing cabinet having at least one horizontal load supporting lath movably end supported at each end thereof on bearings in parallel horizontal tracks of said cabinet, that improvement which comprises:
   a vertical wall membr in said cabinet at each end of and adjacent said lath parallel to and vertically spaced from said tracks; and
   a horizontally disposed bearing rotatable on a vertical axis on each end of said lath bearing against said walls;
   said horizontal bearing being eccentrically mounted for swinging about another vertical axis;
   whereby said lath may be transversely adjusted relative to said walls and tracks by swinging said bearing to different eccentric positions.

2. The improvement claimed in claim 1 in which said horizontal bearing is held on a vertical shaft having a portion of one dimension, said lath has an opening therein of said one dimension accommodating said shaft, and said shaft has a shaft extension having a vertical axis parallel to and offset from that of said vertical shaft, said horizontal bearing being mounted on said shaft extension.

3. The improvement claimed in claim 2 in which a threaded hole intersects each said opening in said lath and a threaded lock screw is positioned in each said hole whereby said vertical shaft may be locked in any rotative position in said opening.

4. The improvement claimed in claim 3 in which said vertical wall members and said bearings are above said lath.

5. In a vertical storage filing cabinet, having at least one load supporting lath movably end supported at each end thereof on bearings in parallel tracks of said cabinet and having a vertical wall member of said cabinet at each end of, above and adjacent said lath parallel to and vertically spaced from said tracks, that improvement which comprises:
   a vertical opening in each end of said lath adjacent said walls;
   a vertical shaft positioned in each said opening for swinging and vertical movement;
   a shaft extension of reduced dimension relative to said vertical shaft having an axis parallel to and spaced from that of said vertical shaft and extending upwardly from said lath;
   a bearing rotatably mounted in a horizontal plane on each said extension bearing against said wall members;
each said lath having a threaded hole intersecting each said opening; and
a threaded lock screw in each said threaded hole for bearing against said vertical shaft;
whereby said lath may on rotation of said vertical shaft be transversely adjusted relative to said walls and tracks and said bearing may be vertically adjusted.

References Cited by the Examiner
UNITED STATES PATENTS

| | | | |
|---|---|---|---|
| 1,892,058 | 12/1932 | Judelshon | 312—332 |
| 2,985,491 | 5/1961 | Hayes. | |
| 3,120,981 | 2/1964 | Faccou | 308—3.6 |

CASMIR A. NUNBERG, *Primary Examiner.*

JAMES T. McCALL, *Examiner.*